United States Patent [19]

Löbach et al.

[11] 4,384,110
[45] May 17, 1983

[54] POLYAMINES CONTAINING UREA GROUPS PREPARED FROM LACTAM OR AMINOCARBOXYLIC ACID

[75] Inventors: Wilfried Löbach, Bonn; Günter Kolb; Wolfgang Lehmann, both of Leverkusen; Günther Cramm, Cologne; Friedhelm Müller, Odenthal; Janos Muszik, Leverkusen, all of Fed. Rep. of Germany

[73] Assignee: Bayer Aktiengesellschaft, Leverkusen, Fed. Rep. of Germany

[21] Appl. No.: 358,406

[22] Filed: Mar. 15, 1982

Related U.S. Application Data

[62] Division of Ser. No. 156,832, Jun. 5, 1980, Pat. No. 4,348,514.

[30] Foreign Application Priority Data

Jun. 25, 1979 [DE] Fed. Rep. of Germany ....... 2925567

[51] Int. Cl.$^3$ ..................... C08G 69/08; C08G 69/14; C08G 71/02
[52] U.S. Cl. ...................................... 528/323; 528/310
[58] Field of Search ............................... 528/323, 310

[56] References Cited

U.S. PATENT DOCUMENTS

| | | | |
|---|---|---|---|
| 3,240,664 | 3/1966 | Earle | 528/367 |
| 3,498,953 | 3/1970 | Elfers | 528/367 |
| 3,966,684 | 6/1976 | Espy et al. | 528/367 |

FOREIGN PATENT DOCUMENTS 46-20827  6/1971  Japan .

*Primary Examiner*—Harold D. Anderson

*Attorney, Agent, or Firm*—Sprung, Horn, Kramer & Woods

[57] ABSTRACT

Non-crosslinking, water-soluble polyamines which can be obtained by reacting (A) basic polyureas which have been prepared by condensation of ureas with polyamines containing at least three amino groups, of which at least one is a tertiary amino group, or with mixtures of these polyamines with aliphatic, araliphatic, cycloaliphatic or heterocyclic polyamines containing two primary or two secondary amino groups or one primary or one secondary amino group, and optionally with ω-aminocarboxylic acids containing at least three carbon atoms, or lactams thereof, (B) polyalkylenepolyamines of the general formula

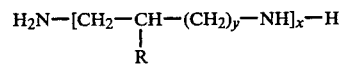

in which
R denotes H or CH$_3$,
the indices y are in each case identical or different and denote the number 0 or 1 and
x denotes a number from 4 to 2,500, or mixtures of these polyalkylenepolyamines with amines of the same general formula, but in which
x denotes a number from 1 to 3, and (C) compounds which are polyfunctional towards amino groups, are used as agents for increasing the retention of fibres, fillers and pigments, for accelerating the drainage in the production of paper and for working up effluents from paper machines by filtration, sedimentation and flotation.

5 Claims, No Drawings

POLYAMINES CONTAINING UREA GROUPS PREPARED FROM LACTAM OR AMINOCARBOXYLIC ACID

This is a division of application Ser. No. 156,832, filed June 5, 1980, now U.S. Pat. No. 4,348,514.

The invention relates to non-crosslinking, water-soluble polyamines which can be obtained by reaction of (A) basic polyureas which have been prepared by condensation of ureas with polyamines containing at least three amino groups, of which at least one is a tertiary amino group, or with mixtures of these polyamines with aliphatic, araliphatic, cycloaliphatic or heterocyclic polyamines containing two primary or two secondary amino groups or one primary or one secondary amino group, and optionally with ω-aminocarboxylic acids containing at least three carbon atoms, or lactams thereof, (B) polyalkylenepolyamines of the general formula

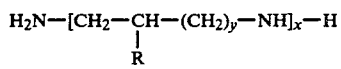

in which
R denotes H or $CH_3$,
the indices y are in each case identical or different and denote the number 0 or 1 and
x denotes a number from 4 to 2,500, or mixtures of these polyalkylenepolyamines with amines of the same general formula, but in which
x denotes a number from 1 to 3, and (C) compounds which are polyfunctional towards amino groups.

The invention furthermore relates to a process for the preparation of these water-soluble polyamines, and to their use as agents for increasing the retention of fibres, fillers and pigments, for accelerating drainage in the production of paper and for working up effluents from paper machines by filtration, sedimentation and flotation.

Higher-molecular basic polyureas, that is to say polyureas with an average molecular weight of greater than 5,000, are used for the preparation of the water-soluble polyamines according to the invention.

Possible basic polyureas are, in particular:

(a) Reaction products of ureas and polyamines which contain at least three amino groups, of which at least one is a tertiary amino group, or mixtures of these polyamines. Examples which may be mentioned are: methylbis-(3-aminopropyl)-amine, N-(2-aminoethyl)-piperazine, 4,7-dimethyltriethylene-tetramine, methyl-bis-(2-aminoethyl)-amine and ethyl-bis-(3-aminopropyl)-amine, the two amines mentioned first being preferred.

Further water-soluble polyureas which may be mentioned are:

(b) Reaction products which, in addition to the polyamines listed under (a), are also based on aliphatic, cycloaliphatic, araliphatic or heterocyclic polyamines containing two primary or two secondary amino groups or one primary and one secondary amino group, such as ethylenediamine, 1,6-diaminohexane, 1,4-diaminocyclohexane, 1,2-diaminopropane, 1,3-bis-aminomethylbenzene or piperazine, the two polyamines mentioned first being preferably used.

(c) Reaction products with which, per mol of urea, up to 0.5 mol of polyalkylenepolyamines, such as diethylenetriamine, triethylenetetramine and higher homologues, as well as dipropylenetriamine, tripropylenetetramine and higher homologues, are co-condensed, in addition to the amines mentioned under (a) and (b), and onto the secondary amino groups of which unsaturated compounds, such as acrylic acid, maleic anhydride or acrylamide, are subsequently added.

The condensation reaction is preferably carried out at a molar ratio of polyamine to urea of 1:1, but it can also be carried out at a ratio of 1:0.7 to 1:1.5. The reaction temperature can be varied from 120° to 250° C., and the reaction is preferably carried out at temperatures between 140° and 190° C.

Polyalkylenepolyamines B of the formula

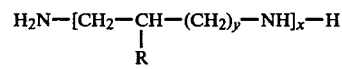

in which
R denotes H or $CH_3$,
the indices y are identical or different and denote the number 0 or 1 and
x denotes a number from 1 to 3 or from 4 to 2,500, which may be mentioned are, above all, polyalkylenepolyamines in which y represents zero, for example ethylenediamine, propylene-1,2-diamine, diethylenetriamine, dipropylenetriamine, triethylenetetramine, tripropylenetetramine, tetraethylenepentamine, tetrapropylenepentamine, pentaethylenehexamine, pentapropylenehexamine, hexaethyleneheptamine, heptaethyleneoctamine, heptapropyleneoctamine and mixtures thereof, and polyethylenepolyamines which in addition also contain one or more piperazine rings, such as aminoethylpiperazine, pentaethylenepentamine, octaethyleneheptamine and mixtures thereof, but in particular (a) the polyethylenepolyamine mixture which is obtained in the discontinuous reaction (see, for example, Houben-Weyl, 4th edition, XI/1, page 44) or in the continuous reaction (for example as in British Patent Specification Nos. 1,832,534 and 2,049,467) of 1 mol of 1,2-dichloroethane with aqueous ammonia (6-30 mols), if appropriate in the presence of added ethylenediamine or diethylenetriamine (U.S. Pat. No. 2,769,841 and U.S. Pat. No. 3,484,488), and which contains considerable proportions of tetraethylenepentamine, pentaethylenehexamine, hexaethylenehexamine, hexaethyleneheptamine, heptaethyleneheptamine and higher amines, and above all (b) the polyethylenepolyamine mixture which remains after distilling off ethylenediamine, and if necessary also diethylenetriamine and triethylenetetramine, from the base mixture prepared according to a), (c) the polyacidic oligomeric amines which can be prepared by condensation of 1,2-dichloroethane with the abovementioned polyethylenepolyamines, individually or as mixtures, and have an average molecular weight of 1,000 to 10,000, in particular 2,000 to 5,000, and (d) the polyacidic amines which can be obtained by polymerisation of 1,2-alkyleneimines and have an average molecular weight of 1,000 to 10,000, in particular 2,000 to 5,000.

Further polyalkylenepolyamines of the abovementioned formula which may be mentioned are:

(e) pure polypropylenepolyamines and mixtures thereof, (f) mixed polyethylenepolypropylenepolyamines and mixtures thereof, above all those which are obtained by reacting ethylenediamine or propylene-1,3-diamine with acrylonitrile once or several times, in each case with subsequent hydrogenation, for example polyacidic amines of the formula $$H_2N\text{-}[CH_2\text{-}CH_2\text{-}CH_2\text{-}NH]_x\text{-}H$$

wherein
x denotes an integer from 1 to 10, and those of the formula $$H[NH\text{-}CH_2\text{-}CH_2\text{-}CH_2]_m\text{-}NH\text{-}CH_2\text{-}CH_2\text{-}NH\text{-}[CH_2\text{-}CH_2\text{-}CH_2\text{-}NH]_nH$$

wherein
m denotes an integer from 1 to 5 and
n denotes an integer from 0 to 5, and also (g) the polyacidic amines which can be prepared by condensation of 1,2-dichloroethane with the polyalkylenepolyamines mentioned under (e) and (f) and have an average molecular weight of 1,000 to 10,000, in particular 2,000 to 5,000.

In some cases, it is advantageous for part of the polyalkylenepolyamines B used to be replaced by other types of di-, tri-, tetra-, penta- or hexa-amines, for example by amines of the formula $$Y\text{-}[(CH_2\text{-}CH\text{-}CH_2\text{-}NH)_p\text{-}H]_q$$
$$\qquad\qquad |$$
$$\qquad\qquad R_3$$

in which
Y represents oxygen, sulphur or the radical of an aliphatic, cycloaliphatic, araliphatic or aromatic compound which is at least difunctional and contains hydroxyl and/or sulfhydryl groups,
$R_3$ denotes hydrogen or the methyl group, p denotes an integer of at least 1, preferably between 1 and 3, and q represents an integer of at least 2, preferably between 2 and 4.

Representative examples of these polyamines are bis-(3-amino-propyl) ether, bis-(3-amino-propyl) sulphide, ethylene glycol bis-(3-amino-propyl) ether, dithioethylene glycol bis-(3-amino-propyl) ether, neopentylene glycol bis-(3-amino-propyl) ether, hexahydro-p-xylylene glycol bis-(3-amino-propyl) ether and hydroquinone bis-(3-amino-propyl) ether.

Further amines are those of the formula $$R_4\text{-}N \begin{array}{c} (CH_2\text{-}CH\text{-}CH_2\text{-}NH)_r\text{-}H \\ | \\ R_5 \\ \\ (CH_2\text{-}CH\text{-}CH_2\text{-}NH)_s\text{-}H \\ | \\ R_6 \end{array}$$

in which
$R_4$ represents a $C_1$–$C_{18}$-alkyl radical which is optionally substituted by an amino group or hydroxyl group,
$R_5$ and $R_6$ independently of one another represent hydrogen or a methyl group and
r and s are numbers from 1 to 20, preferably 2 to 5.

Representative examples of these polyamines are ethyl-bis-(3-amino-propyl)-amine, 2-hydroxyethyl-bis-(3-amino-propyl)-amine, n-butyl-bis-(3-amino-propyl)-amine, tris-(3-amino-propyl)-amine and, above all, methyl-bis-(3-amino-propyl)-amine.

The ratio between the basic polyureas A and the polyalkylenepolyamines B can vary within wide limits in the preparation of the water-soluble polyamines according to the invention. In general, those reaction products which have been prepared using the polyureas and the polyethylenepolyamines in a weight ratio of 1 to 10:10 to 1, in particular of 1 to 2.5:2.5 to 1 and preferably of 1 to 1.8:1.8 to 1, are to be preferred.

Compounds C which are polyfunctional towards amino groups and are suitable for the preparation of the polyamines according to the invention are, in particular, those polyfunctional compounds which are capable of reacting completely, in aqueous solution at pH values above 6, preferably above 8, with the amino groups contained in the basic polyamides.

Examples which may be mentioned of compounds which are polyfunctional towards amino groups are: bifunctional compounds, such as α,ω-alkyldihalides, for example, in particular, 1,2-dichloroethane, 1,2-dibromoethane, 1,2-dichloropropane, 1,3-dichloropropane and 1,6-dichlorohexane; ω, ω'-dihalogeno-ethers, for example 2,2'-dichloro-diethyl ether, bis-(β-chloro-isopropyl) ether and bis-(4-chloro-butyl) ether; halogenohydrins and epihalogenohydrins, for example epichlorohydrin, 1,3-dichloro-propan-2-ol, bis-(3-chloro-2-hydroxypropyl) ether and 1,4-dichloro-2,3-epoxybutane; and bis-epoxy compounds, for example 1,2,3,4-diepoxybutane, diglycidyl ethers and ethane 1,2-bis-glycidyl ether; ω-halogenocarboxylic acid halides, for example chloroacetyl chloride, 2-chloropropionyl chloride, 3-chloropropionyl chloride and 3-bromopropionyl bromide; vinyl compounds, for example divinyl ether, divinyl sulphone and methylene-bisacrylamide; and furthermore 4-chloromethyl-1,3-dioxalan-2-one and 2-chloroethyl-chloroformic acid esters, furthermore chloroformic acid esters, 3-chloro-2-hydroxypropyl ethers and glycidyl ethers of polyalkylene oxides, for example polyethylene oxides, as well as of reaction products of 1–50 mols of alkylene oxides, such as ethylene oxide an/or propylene oxide, with 1 mol of dihydric or polyhydric polyols or of other compounds containing at least two active hydrogen atoms; trifunctional compounds, such as 1,3,5-triacryloylhexahydro-s-triazine, and bifunctional alkylating agents of the formula $$\left[Cl\text{-}(CH_2\text{-}CH\text{-}CH_2\text{-}N^{(+)})_{\overline{x}}\text{-}CH_2\text{-}CH\text{-}CH_2\text{-}Cl\right][Cl^{(-)}]_x$$
$$\qquad\qquad\qquad |\qquad\quad |\qquad\qquad\qquad |$$
$$\qquad\qquad\qquad OH\qquad R\qquad\qquad\qquad OH$$

prepared according to U.S. Pat. No. 3,632,559, Example 2, 1.

Particularly preferred compounds C are dichloroethane and epichlorohydrin.

The amounts of the polyfunctional compounds relative to the two components A and B are appropriately chosen so that they do not substantially exceed those amounts required to achieve the desired degree of condensation of the water-soluble polyamine. With regard to the compounds C which are polyfunctional towards amino groups, the minimum amounts to be added in order to obtain a reaction product with the desired high molecular weight or solutions thereof with the intended viscosity (that is to say 100–1,500 mPas, preferably 200–400 mPas, in a 25% strength aqueous solution)

depend mainly on the molecular weight of the two components and can easily be established from case to case by preliminary experiments.

It is important here that all the functional groups of the compounds C have reacted, so that the reaction product is virtually free from self-crosslinking groups.

The polyamines according to the invention can be prepared from the basic polyureas A and the polyalkylenepolyamines B by processes which are known per se, for example by stirring mixtures of A, B and the compounds C, which are polyfunctional towards amino groups, in aqueous media at pH values above 6 and at temperatures between 0° and 140° C. until a sample of the reaction mixture in the form of a 10% strength aqueous solution has a viscosity of at least 10 cP at 25° C. It is frequently advantageous to add the polyfunctional compounds gradually in portions to the mixture of A and B in the aqueous medium, under otherwise identical reaction conditions, until the desired viscosity is reached. If the reaction has been carried out at a relatively high concentration, the content of reaction products, which is preferably between 10 and 30 percent by weight, in the reaction solution is then adjusted to the desired end value by dilution with water. In some cases, to end the reaction when the intended viscosity has been reached, it is necessary to adjust the pH value of the reaction solution to pH 6, but preferably to 4 to 5, by adding acids, for example hydrochloric acid, sulphuric acid, phosphoric acid or acetic acid. This applies especially to the case where the amount of functional compounds added considerably exceeds the minimum amount required to obtain the desired degree of condensation in the water-soluble polyamine.

However, the condensation reaction can also be carried out in a closed vessel at temperatures above the boiling point of the compound C which is polyfunctional towards amino groups, especially if dihalogenoalkanes are used, and preferably between 90°–130° C. and under pressures of 0–50 bars, preferably 3–8 bars. In this case, it is usually not necessary to stop the reaction by adding acid.

The total concentration of the components in the aqueous reaction mixture should be 10 to 50 percent by weight.

In the preparation of the reaction products according to the invention, it is not absolutely necessary for the reaction of the polyfunctional compound C to be carried out with a mixture of A and B. It is also possible first to allow one of the two components A or B to react with the polyfunctional compound C to form a pre-condensate and then to react this pre-condensate with the other component in a second stage.

The polyamines according to the invention are characterised by a minimum molecular weight of 2,500, preferably 5,000. The upper limit of their molecular weight is given by their property of being water-soluble. It is not possible to designate the upper limit of their molecular weight numerically, since this depends greatly on the polyamines on which they are based and on the number of groups conferring water-solubility which they contain.

When the polyamines according to the invention are used as auxiliaries for increasing the retention of fibres, fillers and pigments and as drainage acceleration agents, a procedure is followed which is known per se and in which the polyamines according to the invention are added, in the form of dilute aqueous solutions, to the paper pulp suspension before the head box, the metering point being chosen such that good distribution of the auxiliary in the pulp suspension is ensured but too long a contact time is avoided. The amounts of polyamines which are necessary to achieve the desired retention action and/or drainage acceleration action can be established without difficulty by preliminary experiments; in general, it is advisable to use 0.005 to 0.5 percent by weight of polyamines, relative to the dry weight of the paper. Furthermore, the addition of polyamines according to the invention before the head box of a paper machine has an advantageous effect during working up of the effluents from the paper machine by filtration, flotation or sedimentation; the coagulating action of the polyamines according to the invention facilitates the separation of pulp constituents from the effluent from the paper machine to a very considerable extent.

When the polyamines according to the invention are used as auxiliaries in working up effluents from paper machines by filtration, flotation or sedimentation, it is likewise possible to follow a procedure which is known per se and in which, preferably, the reaction products in question are appropriately added, in the form of dilute aqueous solutions, to the effluent from the paper machine before the entry of the effluent into the save-all.

The amounts of polyamines which effect adequate coagulation of the paper pulp constituents contained in the effluents from the paper machine are chosen according to the composition of the effluents and can easily be established from case to case by preliminary experiments; in general, amounts of 0.005 to 2 g of polyamine per $m^3$ of effluent are sufficient here.

In comparison with similar known compounds (compare, for example, U.S. Pat. No. 3,966,684), the polyamines according to the invention show an increase in the retention efficiency and in the drainage acceleration when used in the pH range of 4.0–8.0.

Surprisingly, the polyamines according to the invention are particularly effective, above all, on paper pulp with a high content of mechanical wood pulp.

Some polyamines according to the invention and their use for increasing the retention of fibres, fillers and pigments and for accelerating drainage in the production of paper are described below.

PREPARATION EXAMPLES

Preparation of the polyureas A

Polyurea 1

A mixture of 435 g of methyl-bis-(3-aminopropyl)amine and 180 g of urea is heated to 190° C. for 1 hour, whilst stirring and passing nitrogen over the mixture. The mixture is then cooled to 100° C. and water is added in an amount such that a 50% strength aqueous solution is obtained.

At 25° C., this solution has a pH value of 12.5, a viscosity of 560 mPas and a base equivalent of 340.

Polyurea 2

A mixture of 145 g of methyl-bis-(3-aminopropyl)amine, 129 g of 2-aminoethylpiperazine and 120 g of urea is heated at 140° C. for 5 hours, whilst stirring and passing nitrogen over the mixture. The mixture is cooled to 120° C. and water is added in an amount such that a 50% strength aqueous solution is obtained. At 25° C., this solution has a pH value of 12.2, a viscosity of 2,300 mPas and a base equivalent of 320.

Polyurea 3

A mixture of 129 g of 2-aminoethylpiperazine and 60 g of urea is heated at 180° C. for 3 hours, whilst stirring and passing nitrogen over the mixture. The mixture is cooled to 120° C. and water is added in an amount such that a 50% strength aqueous solution is obtained. At 25° C., this solution has a pH value of 11.2, a viscosity of 5,000 mPas and a base equivalent of 308.

Polyurea 4

A mixture of 116 g of methyl-bis(3-aminopropyl)amine, 15 g of ethylenediamine and 60 g of urea is heated at 130° C. for 8 hours, whilst stirring and passing nitrogen over the mixture. The mixture is cooled to 120° C. and water is added in an amount such that a 50% strength aqueous solution is obtained. At 25° C., this solution has a pH value of 12.3, a viscosity of 318 mPas and a base equivalent of 32C.

Polyurea 5

A mixture of 35 g of methyl-bis-(3-aminopropyl)amine, 15 g of ethylenediamine, 51 g of diethylenetriamine and 60 g of urea is heated to 190° C. in the course of 2 hours, whilst stirring and passing nitrogen over the mixture, and the mixture is stirred at this temperature for a further 2 hours. It is cooled to 140° C. and water is added in an amount such that a 50% strength aqueous solution results. At 25° C., this solution has a pH value of 12.3, a viscosity of 720 mPas and a base equivalent of 340. 36 g of acrylic acid and 40 g of 50% strength potassium hydroxide solution are added to this solution and the mixture is heated at 60° C. for 8 hours. The solution then has a viscosity of 800 mPas at 25° C.

Polyurea 6

A mixture of 129 g of 2-aminoethylpiperazine, 30 g of ethylenediamine, 51 g of diethylenetriamine and 120 g of urea is heated at 160° C. for 5 hours, whilst stirring. It is cooled to 120° C. and water is added in an amount such that a 50% strength solution results. 49 g of maleic anhydride and 120 g of 50% strength potassium hydroxide solution are added to this solution. At 25° C., the solution thus obtained has a viscosity of 800 mPas.

Preparation and composition of the polyalkylenepolyamines B

Polyalkylenepolyamine 1

The excess ammonia is first separated off, under pressure, from the reaction mixture obtained by continuous reaction of dichloroethane, aqueous ammonia and ethylenediamine in a molar ratio of 1:17:0.4 at 160°–220° C. and under 100 bars, and the resulting bases are then liberated from their hydrochlorides with excess 50% strength sodium hydroxide solution at 130°–135° C. During this reaction, most of the water and ethylenediamine are distilled off, whilst the higher-boiling bases are obtained in the liquid form. The resulting base mixture contains, in addition to 15–20% of water and 3–5% of ethylenediamine, about 15–20% of diethylenetriamine, 2–3% of aminoethylpiperazine, approximately 1% of $H_2N$-$CH_2$-$CH_2$-$NH$-$CH_2$-$CH_2$-$OH$, 15–18% of triethylenetetramine, 3–4% of tetraethylenetetramine, 10–14% of tetraethylenepentamine, 6–10% of pentaethylenehexamine and about 10–15% of higher polyethylenepolyamines and small amounts of sodium chloride and sodium hydroxide.

Polyalkylenepolyamine 2

The residual water, ethylenediamine and most of the diethylenetriamine are distilled off, first under normal pressure and then under a reduced pressure of about 100 mbars, from the base mixture obtained according to Example 1 and the sodium chloride which separates out is removed by filtration.

Polyalkylenepolyamine 3

In addition to water, ethylenediamine and diethylenetriamine, most of the triethylenetetramine is also separated off by distillation, under a final vacuum of about 10–15 mm Hg, from the base mixture obtained according to Example 1 and the inorganic materials which separate out are likewise removed by filtration; the filtration can be facilitated by the addition of kieselguhr and the amine mixture can be noticeably clarified by using active charcoal. Reaction of polyureas A and polyalkylenepolyamines B with polyfunctional compounds C to give the "polyamines containing urea groups" according to the invention.

Polyamine 1

35 g of dichloroethane and 30 g of 40% strength sodium hydroxide solution are added to 100 g of water, 55 g of polyurea A (1) and 38 g of tetraethylenepentamine at 90° C. The mixture is stirred at this temperature until it reaches a viscosity of 350 mPas. It is then cooled to room temperature, concentrated hydrochloric acid is added in an amount such that a pH value of 5 is established, and unreacted dichloroethane is distilled off in vacuo. Water is added in an amount such that a 25% strength solution, relative to the content of active compound, results. At 25° C., this solution has a viscosity of 340 mPas.

Polyamine 2

The procedure followed is as for polyamine 2, but 55 g of polyurea A (1), 58 g of tetraethylenepentamine, 45 g of dichloroethane and 40 g of 50% strength potassium hydroxide solution are employed. At 25° C., the 25% strength polyamine 2, adjusted to a pH of 5, has a viscosity of 320 mPas.

Polyamine 3

45 g of dichloroethane and 20 g of 50% strength potassium hydroxide solution are added to 80 g of water, 50 g of polyurea A (1) and 50 g of polyalkylenepolyamine B (1) at 90° C. The mixture is stirred at this temperature until it has reached a viscosity of 400 mPas. It is cooled, unreacted dichloroethane is distilled off in vacuo, a pH value of 5 is established with concentrated hydrochloric acid, and water is added in an amount such that a 25% strength solution, relative to the content of active compound, results. At 25° C., this solution has a viscosity of 250 mPas.

Polyamine 4

40 g of dichloroethane and 20 g of 40% strength sodium hydroxide solution are added to 80 g of water, 60 g of polyurea A (2) and 60 g of polyalkylenepolyamine B (1) at 90° C. The mixture is stirred at this temperature until it has reached a viscosity of 500 mPas. It is cooled, unreacted dichloroethane is distilled off in vacuo, a pH of 6 is established with concentrated hydrochloric acid, and water is added in an amount such that a 25% strength solution, relative to the content of active compound, results. At 25° C., this solution has a viscosity of 250 mPas.

Polyamine 5

30 g of dichloroethane and 30 g of 50% strength potassium hydroxide solution are added to 120 g of water, 50 g of polyurea A (3) and 35 g of polyalkylenepolyamine B (3) at 75° C. The mixture is stirred at this temperature until it has reached viscosity of 700 mPas. It is cooled, unreacted dichloroethane is distilled off in vacuo and water is added in an amount such that a 25% strength solution, relative to the content of active compound, results. At 25° C., this solution has a viscosity of 900 mPas.

Polyamine 6

35 g of dichloroethane are added to 100 g of water, 45 g of polyurea A (4) and 20 g of tetraethylenepentamine at 90° C. The mixture is stirred at this temperature until it has reached a viscosity of 50 mPas and is then cooled to 70° C. Condensation is carried out at this temperature up to a viscosity of 400 mPas, 30 g of concentrated hydrochloric acid are added, the mixture is cooled and a pH of 5 is established with further hydrochloric acid. Excess dichloroethane is distilled off and the solution is adjusted to 25% strength, relative to the content of active compound. At 25° C., the solution has a viscosity of 360 mPas.

Polyamine 7

15 g of epichlorohydrin are added to 100 g of water, 50 g of polyurea A (1) and 40 g of tetraethylenepentamine. Condensation is carried out at 40° C. up to a viscosity of 250 mPas, and a further 50 g of water are added. A pH value of 4 is established with concentrated hydrochloric acid, and water is added in an amount such that a 25% strength solution results. At 25° C., this solution has a viscosity of 220 mPas.

Polyamine 8

60 g of dichloroethane and 60 g of 50% strength potassium hydroxide solution are added to 200 g of water, 120 g of polyurea A (5) and 40 g of polyalkylenepolyamine B (3) at 100° C. Condensation is effected at 100° C. up to a viscosity of 250 mPas. The mixture is cooled, a pH of 5 is established with concentrated HCl, unreacted dichloroethane is distilled off and water is added in an amount such that a 25% strength solution, relative to the content of active compound, with a viscosity of 340 mPas at 25° C. results.

Polyamine 9

100 g of water, 50 g of polyurea A (6), 50 g of polyalkylenepolyamine B (2) and 40 g of dichloroethane are stirred in a stirred autoclave under a pressure of up to 6 bars and at 120° C. for 1 hour. After letting down, the mixture is made up to a 24% strength solution with water. At 25° C., this solution has a viscosity of 800 mPas.

Use Example 1

Paper (about 80 g/m²) was produced on a laboratory paper machine (Kämmerer type) from 70% of bleached conifer sulphite pulp and 30% of bleached beech sulphate pulp. One type of paper was produced in the acid range and another type at neutral pH values:

(a) Acid range: addition of 30% of China clay as a filler, 1% of rosin size and 3% of aluminium sulphate to the paper pulp. The pH value was adjusted to 4.8 with sulphuric acid.

(b) Neutral range: addition of 30% of calcium carbonate as a filler and 1% of Aquapel 360 XZ (synthetic size based on stearyl-diketene from Messrs. Hercules Inc.) to the paper pulp. The pH value was adjusted to 7.8 to 8 with sodium hydroxide solution.

The 1% strength aqueous solutions of the 25% strength polyamines 1 to 7 were metered in, by means of a metering pump, before the head box of the paper machines. For comparison, 1% strength dilutions of the known retention agent polyurea I according to Example 15 of U.S. Patent Specification No. 3,966,684 or of the known retention agent polyethylenepolyamine II (U.S. Patent Specification No. 3,972,939, Example 1) and mixtures of I:II in the ratio 75:25, 50:50 and 25:75 were likewise metered in.

The solids content of the effluent from the paper machine was determined as a measure of the retention action. The lower this solids content is, the better is the retention action.

The following Table 1 illustrates that the polyamines according to the invention have a very good retention action both in the acid range and in the neutral range, and that this action is better than that obtained when mixtures of polyurea and polyethylenepolyamine retention agents are employed. The amounts added are based in each case on the weight of the air-dried pulp and on the 25% strength solution of the retention agent.

TABLE 1

| | | Dry residue in the effluent mg/l | |
|---|---|---|---|
| Retention agent | Amount added % | (a) acid range pH 4.8 | (b) neutral range pH 7.8 |
| none | | 643 | 785 |
| Polyamine 1 | 0.1% | 182 | 181 |
| Polyamine 2 | " | 171 | 161 |
| Polyamine 3 | " | 195 | 190 |
| Polyamine 4 | " | 186 | 192 |
| Polyamine 5 | " | 188 | 195 |
| Polyamine 6 | " | 165 | 172 |
| Polyamine 7 | " | 187 | 184 |
| Polyamine 8 | " | 185 | 188 |
| Polyamine 9 | " | | |
| I | " | 213 | 312 |
| II | " | 219 | 197 |
| Mixture of 75% of I and 25% of II | | 203 | 286 |
| Mixture of 50% of I and 50% of II | " | 208 | 271 |
| Mixture of 25% of I and 75% of II | " | 212 | 235 |

Use Example 2

The freeness according to Schopper-Riegler was determined as a measure of the drainage acceleration to be expected on a paper machine in practice. The more the freeness is reduced by the retention agent added, the better is the drainage acceleration to be expected.

The so-called drainage time is a further measure of the drainage acceleration to be expected on a paper machine. This drainage time is determined in a freeness tester according to Schopper-Riegler by measuring the time which is required to establish a certain freeness or volume of water in the collecting glass. The shorter this time is, the better is the drainage acceleration which can be achieved. A pulp was obtained from a mixture of 30 parts by weight of unbleached sulphate, 40 parts by weight of clay and 70 parts by weight of mechanical wood pulp using a high-speed stirrer and the pH value was established as follows:

(a) Acid range: addition of 0.5% of aluminium sulphate, pH 5.2 established with sulphuric acid.

(b) Neutral range: pH 7.2 established with sodium hydroxide solution.

To 200 ml of the 1% strength pulp suspension prepared according to (a) or (b), in each case the 1% strength solution was made up to 1,000 ml with water and the freeness was determined with the aid of the Schopper-Riegler apparatus.

The amounts added are based in each case on the weight of the air-dried pulp and on the 25% strength solution of the polyamines 1 to 7.

The following Table 2 illustrates the good drainage effect of the polyalkylenepolyamines according to the invention both in the acid range and in the neutral range. For comparison, the known retention agents mentioned in Use Example 1 were likewise metered in.

In addition to the freeness, the drainage time in seconds which was required for a certain freeness to be achieved is given in the table. This freeness should be slightly below the freeness of the pulp without the addition of a retention agent.

If, in Table 2, the overall properties of each individual product in the acid medium, in the weakly alkaline medium and with additions of 0.1 and 0.2% are examined together, the products according to the invention produce a better drainage acceleration than the known products.

TABLE 2

| | | pH 7.5 | | pH 5.2 + 0.5% of alum + H₂SO₄ | |
|---|---|---|---|---|---|
| Example | Addition in % | Freeness [°SR] | Drainage [seconds] at 65° SR | Freeness [°SR] | Drainage [seconds] at 55° SR |
| without a retention agent | | 68 | 117 | 58 | 110,5 |
| 1 | 0.1 | 50 | 65.8 | 50 | 69.5 |
| | 0.2 | 40 | 63.2 | 46 | 50.7 |
| 2 | 0.1 | 49 | 68.4 | 51 | 69.4 |
| | 0.2 | 48 | 62.2 | 47 | 51.4 |
| 3 | 0.1 | 49 | 67.6 | 49 | 67.8 |
| | 0.2 | 47 | 64.1 | 46 | 50.7 |
| 4 | 0.1 | 51 | 68.9 | 52 | 67.5 |
| | 0.2 | 48 | 64.5 | 47 | 49.3 |
| 5 | 0.1 | 50 | 70.0 | 50 | 67.4 |
| | 0.2 | 48 | 63.8 | 46 | 51.2 |
| 6 | 0.1 | 51 | 69.5 | 50 | 71.1 |
| | 0.2 | 49 | 59.2 | 45 | 53.0 |
| 7 | 0.1 | 49 | 67.5 | 49 | 68.4 |
| | 0.2 | 47 | 62.9 | 47 | 51.6 |
| 8 | 0.1 | 49 | 67.5 | 49 | 70.2 |
| | 0.2 | 48 | 64.6 | 46 | 49.3 |
| 9 | 0.1 | 50 | 68.0 | 49 | 69.8 |
| | 0.2 | 48 | 63.8 | 47 | 50.1 |
| I | 0.1 | 53 | 75.2 | 51 | 74.9 |
| | 0.2 | 50 | 68.4 | 50 | 55.8 |
| II | 0.1 | 51 | 68.9 | 53 | 76.9 |
| | 0.2 | 49 | 64.3 | 52 | 58.7 |
| Mixture of 50% of I and 50% of II | 0.1 | 52 | 70.2 | 52 | 75.8 |
| | 0.2 | 50 | 66.2 | 51 | 56.8 |

We claim:

1. A non-crosslinking, water-soluble polyamine obtained by reacting
(A) a basic polyurea which has been prepared by condensation of (a) a urea with (b) a polyamine containing at least three amino groups, of which at least one is a tertiary amino group, and with (c) an ω-aminocarboxylic acid containing at least three carbon atoms or a lactam thereof,
(B) a polyalkylenepolyamine of the formula

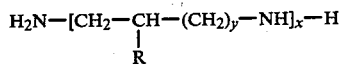

in which
R denotes H or CH₃,
the indices y are in each case identical or different and denote the number 0 or 1 and
x denotes a number from 4 to 2,500, or a mixture of such a polyalkylenepolyamine with an amine of the same formula, but in which
x denotes a number from 1 to 3, and
(C) a compound which is polyfunctional towards amino groups.

2. A polyamine according to claim 1, wherein in the reaction of A, B and C, virtually all the functional groups of the polyfunctional compounds have reacted.

3. A polyamine according to claim 1 or 2, wherein the basic urea A and polyalkylenepolyamine B are employed in a weight ratio of 1 to 10:10 to 1.

4. A polyamine according to claim 1 or 2, wherein A, B and C are reacted in an aqueous medium at temperatures of 0° to 140° C., in a total concentration of 10–60% and at pH values above 6.

5. A polyamine according to claim 1 or 2, wherein the reaction is carried out under pressures of 0 to 50 bars.

* * * * *